United States Patent [19]

Johnston

[11] Patent Number: 4,595,036
[45] Date of Patent: Jun. 17, 1986

[54] ROTARY CONTROL VALVE HAVING QUICK EMERGENCY EXHAUSTING MEANS

[75] Inventor: Charles F. Johnston, Fincastle, Va.
[73] Assignee: Vitec Controls, Inc., Fincastle, Va.
[21] Appl. No.: 580,170
[22] Filed: Feb. 14, 1984
[51] Int. Cl.[4] .......................... F15B 13/06; F15B 20/00
[52] U.S. Cl. .................................. 137/636.4; 137/596; 137/625.11
[58] Field of Search ................ 137/596, 625.11, 636.4, 137/862

[56] References Cited

U.S. PATENT DOCUMENTS

| | | | |
|---|---|---|---|
| 1,758,552 | 5/1930 | Allen et al. | |
| 2,700,985 | 2/1955 | Gleasman. | |
| 3,469,606 | 9/1969 | Getman | 137/636.4 |
| 3,520,327 | 7/1970 | Claydon et al. | 137/556.6 |
| 4,153,076 | 5/1979 | McNeil et al. | 137/624.11 |
| 4,211,258 | 7/1980 | Switall | 137/862 |
| 4,380,251 | 4/1983 | Weaver | 137/877 |

Primary Examiner—Gerald A. Michalsky
Attorney, Agent, or Firm—Fisher, Christen & Sabol

[57] ABSTRACT

A combined spool and rotary disc valve has a quick emergency exhausting means. In normal operation, the spool valve allows pressurized fluid to flow between an inlet and a choice of one or more outlets. When quick emergency exhausting of all of the outlets is desired, the spool valve is disposed such that all the outlets communicate through an exhaust slot in the rotary disc valve, through an interior passageway of the cylinder, further through a second part of the spool valve into a different interior passageway which leads to an annular channel which is exhausted by one or more exhaust openings through the barrel housing. The normal flow of pressurized fluid can also be reversed such that, with blockage of all exhaust openings in the barrel housing, the rotary control valve becomes a mixing valve.

6 Claims, 8 Drawing Figures

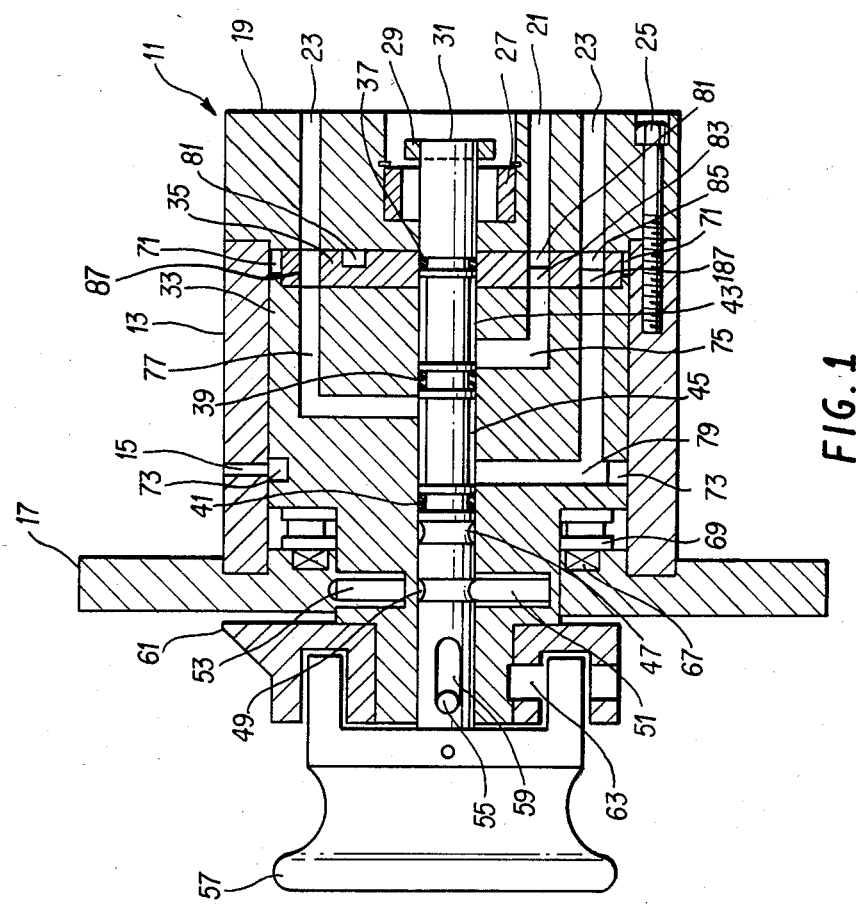
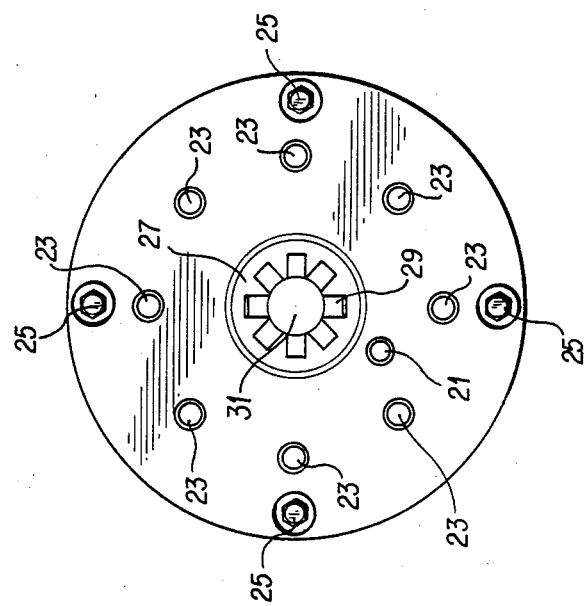
FIG. 1
FIG. 2

ROTARY CONTROL VALVE HAVING QUICK EMERGENCY EXHAUSTING MEANS

BACKGROUND OF THE INVENTION

This invention relates to valves used generally to communicate pneumatic commands to a variety of destinations. The machinery being controlled is usually predominantly hydraulic or pneumatic, such as industrial automation machines or robots, but is not limited to these fields. Communication between the machines' automatic controls and operators are normally accomplished by push-buttons or selectors, with visual indicators given feedback to the operators. However, when changing the desired operating command through to a particular destination, it was important that no inadvertent pulse commands be given to the wrong destinations while in the process of selecting the desired passageway to communicate pneumatic commands.

Because it is often necessary to quickly shut down machines being commanded by pneumatic signals, the activation of emergency shutdown commands should be brought about simply, preferably by pushing the control knob in. This way the operator can quickly hit the control knob with his hand or other body surface. This is particularly important when the operator's hand may be slippery due to contact with material being processed. Additionally, once the emergency position is engaged, the valve mechanism should require a positive action on the part of the operator to disengage from the emergency position.

It is known to provide a combined reciprocating and rotary valve having circumferentially spaced working ports. U.S. Pat. No. 3,520,327 shows such a structure. However, this structure shows a coil spring acting from a single rotational position upon the central spool. Additionally, the stop mode is engaged by holding in the handle to exhaust all ports. Letting go of the handle will return the valve to a command communicating mode. Finally, the valve uses a poppet type mechanism to control the flow of fluids.

As the complexity of the manual controls increases it has been a general practice to add push button valves and to accomplish the control with interconnecting tubing or circuits. With each additional moving part and circuit the change of malfunction is increased and the skill of people operating the manual controls must be greater. Many control valve manufacturers, in order to compete, are making cheaper manual valves which further increases the chance of malfunction. Manual controls that are duplicated on many machines are as follows: 1. manual mode with visual indicator; 2. automatic mode with visual indicator; 3. power air on with visual indicator; 4. power air off; 5. cycle start; 6. cycle stop; 7. reset; and 8. emergency stop, etc. . . .

Very little attention has been given to the design of these functions especially in regard to human error, circuit malfunction (pinched or broken tubes), or component failure. By far the most important function of the above is the *Emergency Stop*. Also operating personnel should be made to think prior to initiating any of the above functions. Power valves are usually designed to shift or not to shift in case of control air loss or emergency stop mode. Detented valves are used for clamps and sometimes spring return valves are used for drill heads, etc. The important things for emergency stop are as follows: 1. kill control air and positively exhaust; 2. be actuated fast and easy at any point of the machine cycle; 3. be mechanically detented off with no chance of inadvertent return. The important things for other functions is that the operator person may select prior to actuating any function and without bumping functions between his selections. It is believed that by using simple and reliable components a greater degree of control with less human error, and with less component and circuit failures, can be achieved.

SUMMARY OF THE INVENTION

Briefly, the illustrative embodiment of the invention comprises a barrel housing having exhaust openings, a base plate having inlets and outlets and a locking means, a disc valve having a concentric groove, aperture, and exhaust slot for communicating between the base plate and a cylinder having interior passageways communicating with either a central opening or the exhaust openings in the barrel housing, and a spool valve having a plurality of annular passageways for communicating with the interior passageways of the cylinder and also a locking pin to engage the locking means of the base plate. The spool valve by traveling along its longitudinal axis can control the communication between the various interior passageways of the cylinder. In one such position, the passageways communicate commands from inlet to outlet. In another longitudinal position the spool valve provides for exhausting of all outlets for emergency shutdown.

By combining a *balanced* spool 3-way valve with positive mechanical detents and a rotary lapped disc valve pinned to a rotary cylinder containing interior passageways and serving as the housing for the spool valve, an extremely versatile and useful tool for manual operation of fluid machine controls is provided. The lapped disc valve allows for any number of multi-3 way valve outputs which may be selected prior to actuation. The detented spool design allows for a fast emergency stop actuation in any of the above selected positions. Selection and emergency stop are both accomplished with a common operator. Emergency stop actuation however does not change the rotary position. Therefore, the valve output can be commenced after emergency exhaust without changing the rotary position of the valve.

The revolver valve has basically two rugged moving parts, one of which self compensates for wear and the other which can easily and quickly be repaired, if necessary. This combination of valving eliminates not only a number of moving parts but a great deal of circuitry. It also gives a positive visual indication of the mode and allows the operator to select a mode prior to actuation of that mode.

BRIEF DESCRIPTION OF THE DRAWINGS

FIG. 1 is a vertical cross section taken parallel to the longitudinal axis when the valve is in the emergency exhaust mode for an emergency shutdown.

FIG. 2 is an exterior end elevation of the base plate.

DETAILED DESCRIPTION OF THE INVENTION

Figure 6:
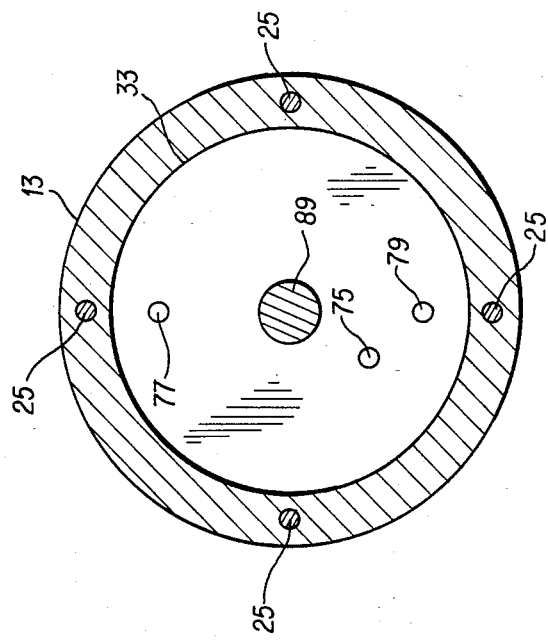
FIG. 6 is a vertical cross section taken perpendicular to the longitudinal axis along view lines 6—6 in FIG. 4.

In FIG. 1, the valve 11 is generally shown and comprises a barrel housing 13 with one or more circumferentially spaced exhaust openings 15. The barrel housing 13 is disposed between the face plate 17 and the base plate 19. The base plate 19 has one or more inlets 21 for admitting fluid and one or more outlets 23 for discharging fluid. The base plate 19 is attached to the barrel housing 13 by one or more screws 25. In the central opening of the base plate 19, is a notch-radially-outward ring 27 for receiving locking pin 29. The locking pin 29 is held in the end of spool valve 31. Spool valve 31 is disposed in the central opening of cylinder 33. Disposed between the cylinder 33 and the base plate 19 is the disc valve 35.

Figure 3:
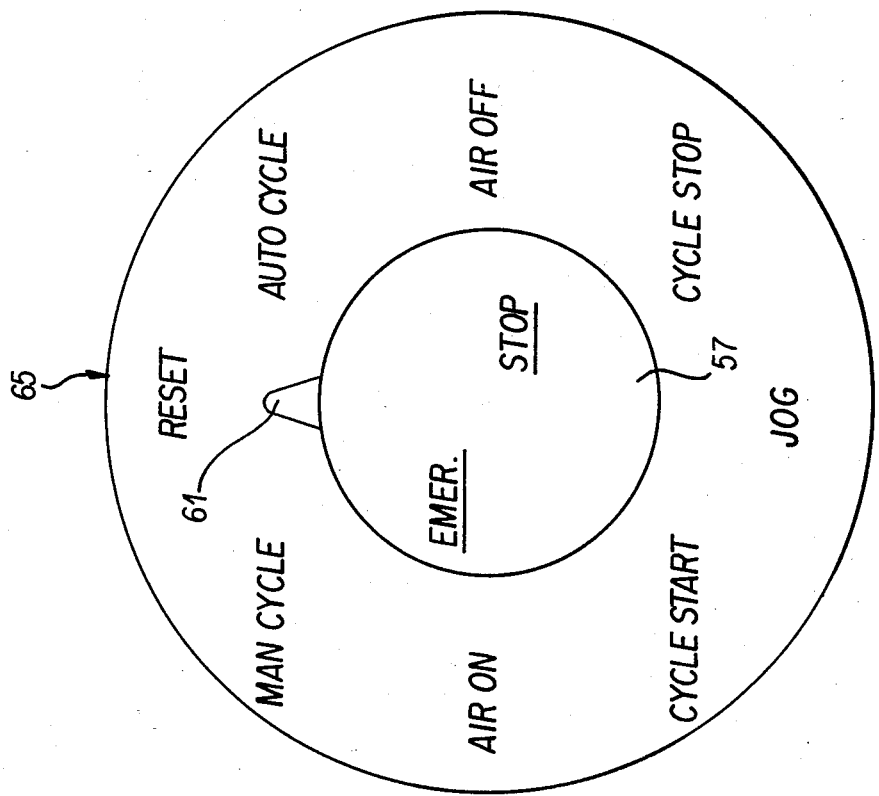
FIG. 3 is an exterior front elevation of the knob and face plate, with pointer showing rotary position.

Proceeding from the locking pin 29 along the longitudinal axis of spool valve 31, there is a first of three sets of O-rings 37, 39, 41 which provide effective seals for the first removed annular passage 43 and the second removed annular passage 45 of spool valve 31. The designation first removed and second removed for annular passages 43 and 45 reflects their spacing along the longitudinal axis of spool valve 31 from the locking pin 29. Further removed from the second annular passage 45 and its sealing O-ring 41, are the first removed and second removed detent-engaging channels 47 and 49. Longitudinal detent 51 engages the channel 47 and 49 to govern travel of spool valve 31 along its longitudinal axis. Rotary detent 53 governs the rotary motion of cylinder 33 which is pinned to disc valve 35. Pin 55 of cylinder 33 attaches knob 57 to spool valve 31. Pin 55 also longitudinally travels in longitudinal travel limiting slot 59 of spool valve 31, which controls the stroke of spool valve 31. Finally, pointer 61 is permanently engaged by a screw (not shown) that travels through screw pathway 63. So attached, pointer 61 is a positive retainer for pin 55. Pointer 61 is also designed with a special close fitting flange which prevents foreign objects from becoming lodged in the travel space used when emergency shutdown is desired. Finally, pointer 61 provides a positive visual readout to any operator by its juxtaposition to face plate 65 shown in FIG. 3.

Spring 67 provides preloaded force on thrust bearing 69 that transmits the force thus biasing cylinder 33 toward base plate 19. This force moves cylinder 33 through wear compensation space 71. In this way, cylinder 33 is allowed to maintain imminent contact with disc valve 35 and base plate 19. This is particularly important when inlet 21, outlets 23, and the interior passageways within the cylinder 33 must not only line up for effective communication of fluid commands, but also line up in such a way that loss of fluid does not occur by leaks caused by lack of imminent contact between the cylinder 33, the disc valve 35, and the base plate 19.

Figure 5:
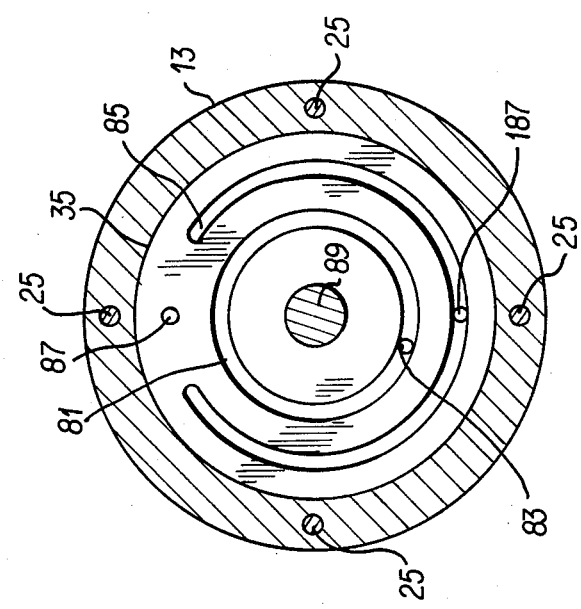
FIG. 5 is a vertical cross section taken perpendicular to the longitudinal axis along the view lines 5—5 shown in FIG. 4.

The interior passageways of the cylinder 33 are designated first interior passageway 75, second interior passageway 77, and third interior passageway 79. The interior passageways are depicted in FIG. 1. FIG. 5, however, shows the various grooves, slots, and apertures with which the passageways 75, 77, 79 communicate.

A first interior passageway 75 of cylinder 33 runs from concentric groove 81 via pressurizing aperture 83 to first removed annular passage 43. The second interior passageway 77 of cylinder 33, runs from command communicating aperture 87 of disc valve 35 to second removed annular passage 45. The third interior passageway 79 of cylinder 33 runs also from exhaust slot 85 of disc valve 35 to annular channel 73 which communicates with circumferentially spaced opening 15 and, depending upon the longitudinal position of spool valve 31, second interior passageway 77 via second removed annular passage 45 or only the second removed annular passage 45 which is not in a position to communicate with second interior passageway 77.

FIG. 2 shows an exterior end elevation of base plate 19. Four screws 25 are shown as attaching the base plate 19 to barrel housing 13. In the configuration shown of base plate 19 in FIG. 2, there is only one inlet 21. Again in the configuration shown in FIG. 2 of base plate 19 there are eight outlets 23. Also shown is the notch-radially-outward ring 27. Locking pin 29 on the end of spool valve 31 is shown in FIG. 2.

Figure 4:
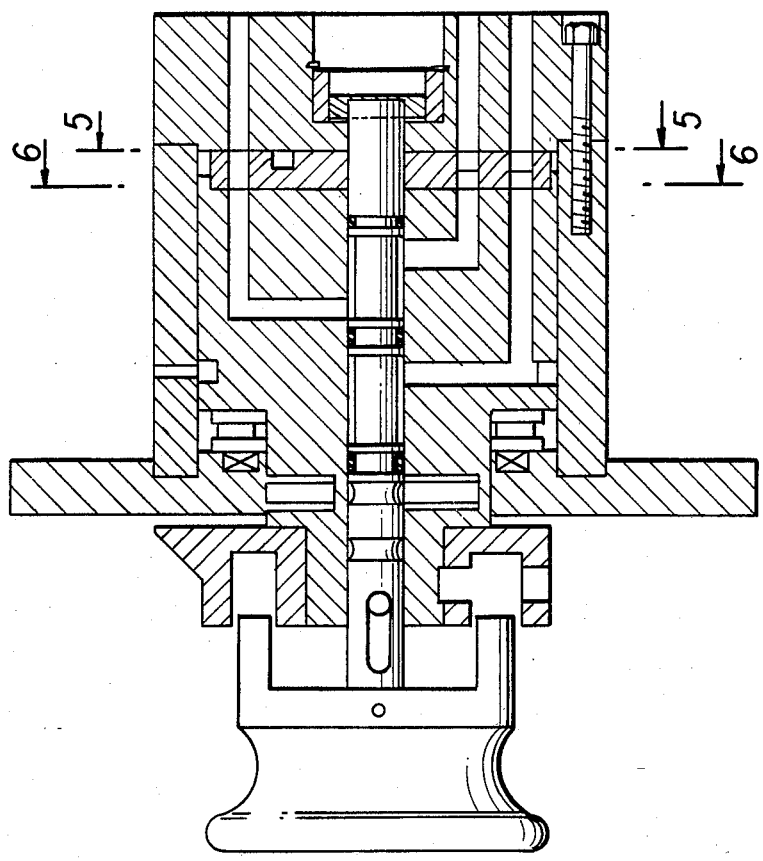
FIG. 4 is a vertical cross section taken along the longitudinal axis when the valve is in an operating mode for supplying pressurized fluid from an inlet to an outlet.

FIG. 4 shows the derivation of FIGS. 5 and 6 by view lines 5—5 and 6—6. FIG. 4 also illustrates the operating mode for rotary control valve 11. This is to be contrasted to FIG. 1 in which rotary control valve 11 is shown in the emergency exhaust position. In FIG. 1, all outlets 23 communicate through exhaust slot 85 and command communicating aperture 87 with second interior passageway 77, hence via second removed annular passage 45 to third interior passageway 79 and eventually to annular channel 73 and finally circumferentially spaced exhaust openings 15. However, in FIG. 4, the longitudinal position of spool valve 31 prevents such communication through second removed annular passage 45. Instead, first removed annular passage 43 provides for communication between second interior passageway 77 and first interior passageway 75. This has the effect of allowing inlet 21 to communicate with the selected outlet 23; selection decided by the rotary position of cylinder 33 and disc valve 35. In this mode shown in FIG. 4, fluid can flow through inlet 21 which is in communication with concentric groove 81 and pressurizing aperture 83, further through first interior passageway 75, further through first removed annular passage 43 of spool valve 31, into second interior passageway 77, further through command communication aperture 87 into outlet 23.

FIG. 5 illustrates the disc valve 35 disposed within barrel housing 13. Shown radially outward from central opening 89, which permits spool valve 31 to travel in a longitudinal direction, are the concentric groove 81 and pressurizing aperture 83. Proceeding further radially outward, exhaust slot 85, command communicating aperture 87, and aperture 187 are shown. At the outwardmost radial position of disc valve 35 is the outside surface for engagement of disc valve 35 with the inside surface of barrel housing 13. The screws 25 are shown in their positions.

FIG. 6 illustrates the face of cylinder 33 that engages the second removed face, in relation to the locking pin 29 of spool valve 31, of disc valve 35. The cylinder is also shown disposed within barrel housing 13. The ends of the first 75, second 77, and third 79 interior passageways which communicate with the various apertures of the disc valve 35 are shown. Finally, central opening 89 allowing for longitudinal travel of spool valve 31 within cylinder 33 is shown.

Figure 7:
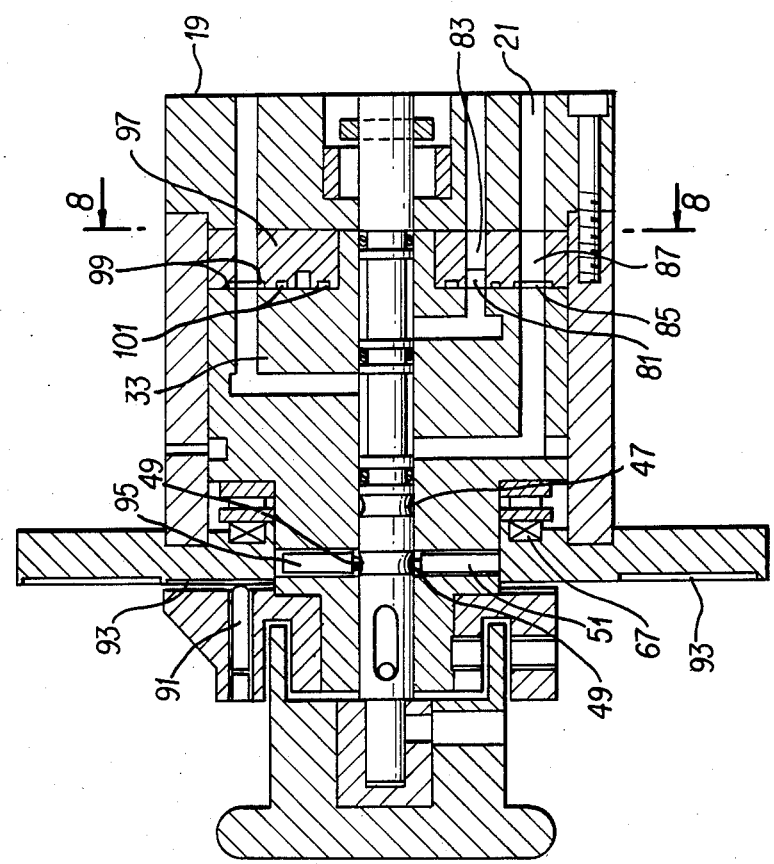
FIG. 7 is a vertical cross section taken parallel to the longitudinal axis when the valve is in the emergency exhaust mode for an emergency shutdown, and shows the preferred embodiment of the invention.

FIG. 7 shows the preferred embodiment of this invention. Basically, FIG. 7 is the same as FIG. 1 with the following noted exceptions. The method of operation stays also basically the same. The first modification is that rotary detent 53 in FIG. 1 has been shifted from a vertical orientation to a horizontal orientation. The horizontally disposed rotary detent 91 is shown engaging a rotary detent engaging plate 93. Most preferably this rotary detent engaging plate 93 is of a hard substance, such as steel, that will not wear excessively due to the rotary motion of the horizontally disposed rotary detent 91. At the appropriate position, rotary detent engaging plate 93 can have depressions to provide a stop for the horizontally disposed rotary detent 91. As a consequence of this shift of the rotary detent to a horizontal orientation, the space left open by the removal of rotary detent 53 in FIG. 51 is now occupied by a second longitudinal detent 95. This second longitudinal detent 95 engages the first and second removed detent engaging channels 47 and 49 in the same manner that the original longitudinal detent 51 does.

Also shown in FIG. 7, the disc valve 35 of FIG. 1 has essentially been partially reversed in longitudinal orientation. In FIG. 7 the preferred disc valve 97 is shown with concentric groove 81, pressurizing aperture 83, in an essentially longitudinally reversed positions. In this preferred embodiment shown in FIG. 7, O-ring 99 for command aperture and O-rings 101 for pressure ring are shown engaging the cylinder 33 to provide an effective seal. In this preferred embodiment for rotary control valve 11, the force needed to be exerted by spring 67 to assure tight engagement of base plate 19, preferred disc valve 97, and cylinder 33 is greatly reduced. With this orientation of the concentric groove 81 there is great reduction in the amount of surface area upon which the pressure (entering through inlet 21) is exerted. This reduction also allows easier rotation when shifting from one selected outlet 23 to another selected outlet 23 due to the lighter spring force. Finally, it should be noted that in all modes of operation, if the valve is over pressurized through inlet 21, the effect is for the fluid to be exhausted through the circumferentially spaced exhaust openings 15.

Figure 8:
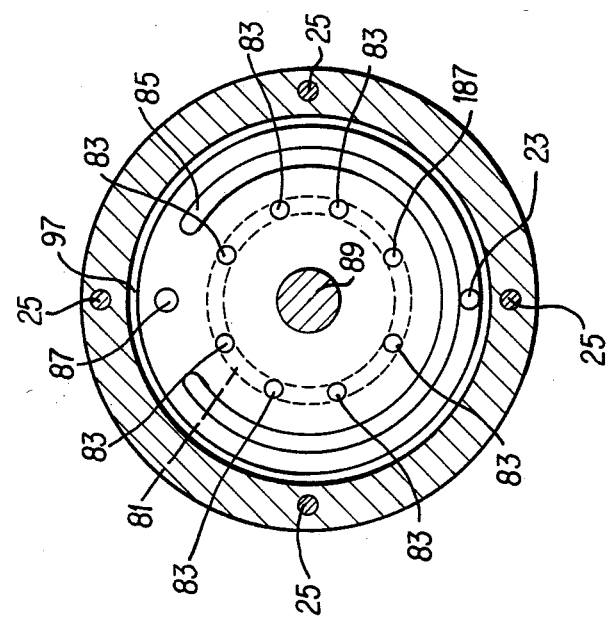
FIG. 8 is a vertical cross section taken perpendicular to the longitudinal axis along view lines 8—8 in FIG. 7.

FIG. 8 illustrates the preferred disc valve 97 disposed within barrel housing 13. Shown radially outward from central opening 89 which permits spool 31 to rotate and to travel in a longitudinal direction are the concentric groove 81 (shown in broken line to indicate a hidden view) and, in this preferred embodiment, the eight pressurizing apertures 83. Proceeding further radially outward, exhaust slot 85 and command communicating aperture 87 are shown. At the outward most radial position of preferred disc valve 97 is the outside surface for engagement of preferred disc valve 97 with the inside surface of barrel housing 13. Finally, screws 25 for attaching base plate 19 to barrel housing 13 are shown.

Finally, a locking mechanism may be engaged through screw pathway 63 to prevent operation of the rotary control valve 11. By freezing the spool valve 31 into the emergency exhaust mode shown in FIG. 1 and FIG. 7, no inadvertent or maliciously motivated fluid commands may be communicated to any of the outlets 23. This locking means can be any conventional lock that ensures engagement of a pin through screw pathway 63 and can also require a key or other control means to remove from rotary control valve 11.

When the rotary control valve 11 is used as a mixing valve, essentially all flows of fluid are reversed. The inlet(s) 21 of base plate 19 becomes an outlet. This outlet 21 can then allow the fluid to flow into a mixing kettle or into a reactor vessel. The outlets 23 of base plate 19, in this moade when the rotary control valve 11 is used as a mixing valve, become inlets and the rotation of cylinder 33 and disc valve 35 selects one of the multiple outlets 23 shown in FIG. 2. The communication pathways amongst the interior passageways 75, 77, and 79; first removed and second removed annular passages 43 and 45; pressurizing aperture 83; and command communicating aperture 87 remain essentially the same, but the direction of fluid flow is reversed. However, all circumferentially spaced exhaust openings 15 are blocked to allow proper operation of the rotary control valve 11 when it is being used as a mixing valve.

In operation the rotary control valve 11 is shown in FIG. 1 pushed to the right (of the drawing) or in emergency stop mode. Fluid entéring inlet 21 flows to concentric groove 81 of the disc valve 35 through the base plate 19 and is then directed along first interior passageway 75 of cylinder 33 to spool valve 31. However, in the position shown in FIG. 1, the fluid flow is blocked. It should be noted that the blocked fluid is acting on a balanced spool valve 31, hence there is no force exerted to shift the spool valve 31 out of the emergency stop mode configuration. The longitudinal detent 51 applies additional force to stabilize the spool valve 31, thus helping to prevent inadvertant shift out of the emergency stop mode configuration. All of the outlets 23 are positively exhausted by means of annular channel 73 which is connected through cylinder 33 to the exhaust openings 15.

Spring 67 exerts a force through thrust bearing 69, biasing cylinder 33 against disc valve 35, which biases disc valve 35 against base plate 19. This also has the effect of opposing fluid pressure acting on the concentric groove 81.

When it is desired to shift the fluid communication to another outlet 23, the knob 57 being generally shifted to the right of the position shown in FIG. 4. In this way, no pressure is communicated through spool valve 31 from inlet 21 to outlet 23 during the rotation of the cylinder 33 and disc valve 35 into the desired position. Rotary detent 53 provides a feel and mechanical lock for engaging in any of the desired positions.

Knob 57 is keyed to cylinder 33, disc valve 35 and spool 31 by pin 55. Additionally, disc valve 35 is screwed and pinned to cylinder 33 and must rotate with it. Spool valve 31 turns with this assembly. Locking pin 29 is disengaged from notched-radially-outward ring 27 when the rotary control valve 11 is in the position shown in FIG. 1. Notched-radially-outward ring 27 is keyed to base plate 19.

In FIG. 4, knob 57 has been shifted to the left (of the drawing) of its position in FIG. 1, bringing with it spool valve 31 and thus connecting inlet 21 through cylinder 33 to outlet 23. Pin 55 determines the stroke of spool valve 31 by travel in the milled slot 59. It should be noted that the fluid command from inlet 21 can be directed to any of the various outlets 23. However, due to the positioning required by locking pin 29 and notched-radially-outward ring 27, selection must be made prior to the flow of fluid through inlet 21 and outlet 23 which is accomplished by pulling knob 57 to the left (of the drawing). It also should be noted that spool valve 31 is detented in the left position as well, thus resisting inadvertant disengagement of the fluid command.

Engaging the valve 11 into the emergency stop position shown in FIG. 1 can be done from any of the positions where inlet 21 communicates with any of the outlets 23. This emergency engagement quickly blocks any communication between any of the outlets 23 and inlet 21, while simultaneously exhausting the outlet selected for the operating mode shown in FIG. 4. The emergency position will remain in engaged until selection is made and knob 57 is again pulled to the left allowing a fluid command to flow to the selected outlet 23. Pointer 61 gives positive indication of the outlet 23 selected prior to actuation. The outer flange of pointer 61, shown horizontally disposed over and under the knob 57 in FIGS. 1 and 4, is an added safety precaution to prevent foreign objects from blocking the knob's 57 travel into the emergency stop position shown in FIG. 1.

In addition to manual operation of the rotary control valve 11 by knob 57, this valve 11 can be used as part of an automatic control system, particularly an automatic stepping unit. By connecting spool valve 31 to a mechanism for effectuating automatic commands, which commands may either be electrical, fluid, or hydraulic in nature, the spool valve 31 can be both rotated and moved longitudinally. Typically, the mechanism can contain a cylinder to shift spool valve 31 and a gear to engage a rack which is controlled by another air cylinder (Index cylinder). The index cylinder moves disc valve 35 clockwise one station or step each time it is actuated or indexed. A rotary actuator and/or spring to *reset* unit when disengaged and air supply is off can also be used. The gear is disengaged from rack at this time. If the automatic control system is mounted on the spool valve's 31 end away from the pointer 61 and face plate 17, then the valve 11 can still give a positive visual indication via the pointer's 61 position of the outlet 23 selected. Furthermore, if the mechanisms selected for both rotary and longitudinal movement of the spool valve 31 are also designed to allow manually initiated (by pushing knob 57 to the position shown in FIG. 1) longitudinal motion, the rotary control valve 11 can still preserve its function of having a quick emergency exhausting means. Finally, the circumferentially spaced exhaust openings 15 provide a means to remove residual air pressure from outlets 23 and any communicating tubes (to machinery being controlled) that are no longer selected for receiving pneumatic commands. For instance when the disc valve 35 is shifted to a new outlet 23, the formerly selected outlet 23 is then positively exhausted through the exhaust openings 15.

What is claimed is:
1. A rotary control valve comprising:
   a barrel housing having a plurality of circumferentially spaced exhaust openings therein;
   a base plate having at least one inlet for admitting fluid and at least one outlet for discharging fluid; said base plate having a center opening surrounded by a notched-radially-outward ring for receiving a locking pin in a plurality of positions, said base plate being attached to said barrel housing;
   a disc valve having a center opening and a concentric groove disposed at a first constant radial distance in a first face of said disc valve which is adapted to admit pressurized fluid from said at least one inlet; said disc valve having a pressuring aperture adapted to permit communication between said concentric groove and an opposite face of said disc valve; said disc valve having an exhaust slot disposed in said first face of said disc valve partially circumscribing said disc at a second constant radial distance, said disc valve having a second aperture in communication with said exhaust slot at a radial distance which is the same as said second constant radial distance; and a command communicating aperture adapted to permit communication between said first face and said opposite face of said disc valve; said command communicating aperture being at a radial distance which is the same as said second constant radial distance;
   a spool valve; said spool valve having a first spool valve axial position and a second spool valve axial position;
      a rotatable cylinder having a central opening therein; said rotatable cylinder having an annular channel adapted for communicating with said circumferentially spaced exhaust openings in said barrel housing; said rotatable cylinder having a first interior passageway for communication between said concentric groove and said central opening of said cylinder; said rotatable cylinder having a second interior passageway for communication between said central opening and a radially outward position on said disc valve at a radial distance which is the same as said second constant radial distance, wherein in said first spool valve axial position said second interior passageway can communicate with said first interior passageway and said command communicating aperture of said disc valve; said rotatable cylinder having a third interior passageway for communication in said first spool valve axial position between said central opening of said cylinder and said exhaust slot, but is not in communication with said second interior passageway of said disc valve; said third interior passageway extending to an outermost periphery of said rotatable cylinder for communication in both said first and said second spool valve axial positions between said central opening of said rotatable cylinder and said annular channel;
   in said second spool valve axial position said second interior passageway can communicate with said third interior passageway and with said command communicating aperture, and is not in communication with said first interior passageway;
   said spool valve being disposed within said central opening of said cylinder, said central opening of said disc valve, and said central opening of said base plate; said spool valve having said locking pin fixed thereto for selective engagement with individual notches of said notched-radially-outward ring of said base plate; said spool valve, in combination with said rotatable cylinder, forming two axially disposed annular passageways removed serially from said locking pin;
   said spool valve being axially movable within said rotatable cylinder between said first spool valve axial position and said second spool valve axial position;
   said spool valve being fixed for rotation with said rotatable cylinder;
      said spool valve in said second spool valve axial position, wherein said locking pin is not locked into a rotational position corresponding to permitting communication between said second interior passageway of said cylinder and said outlet port of said base plate, being in an axial position such that said first interior passageway of said rotatable cylinder is blocked; said spool valve in said second spool valve axial position permitting communication between said second interior passageway and said third interior passageway through a second one of said two axially disposed annular passageways; said spool valve in said first spool valve axial position, when locked into a rotational position corresponding to permitting communication between said second interior passageway and said outlet port of said base plate, being in an axial position such that said first interior passageway communicates with said second interior passageway through a first one of said two axially disposed annular passageways.

2. The rotary control valve of claim 1 wherein axial travel of said spool valve is limited by a spool valve pin which is fixedly attached to said cylinder and which engages a slot in said spool valve, said slot having a predetermined length.

3. The rotary control valve of claim 1 wherein said rotatable cylinder is indexed during rotary motion by a detent mechanism.

4. The rotary control valve of claim 1 wherein the axial travel of said spool valve is indexed by a detent mechanism selectively engaging one of two annular detent channels, each of said two annular detent channels corresponding to respective ones of said first spool valve axial position and said second spool valve axial position.

5. The rotary control valve of claim 1 wherein said cylinder is spring biased against said disc valve, in turn spring biasing said disc valve against said base plate; said biasing compensating for any reduction due to wear in thickness of said disc valve.

6. The rotary control valve of claim 1 wherein said spool valve has a knob fixedly attached thereto, whereby axial movement and rotary movement can be imparted to said spool valve by manual manipulation of said knob.

* * * * *